(12) United States Patent
Zhang et al.

(10) Patent No.: US 7,461,248 B2
(45) Date of Patent: Dec. 2, 2008

(54) AUTHENTICATION AND AUTHORIZATION IN HETEROGENEOUS NETWORKS

(75) Inventors: Hong Zhang, Beijing (CN); Luliang Jiang, Beijing (CN); Dajiang Zhang, Beijing (CN)

(73) Assignee: Nokia Corporation, Epsoo (FI)

( * ) Notice: Subject to any disclaimer, the term of this patent is extended or adjusted under 35 U.S.C. 154(b) by 787 days.

(21) Appl. No.: 10/819,151

(22) Filed: Apr. 7, 2004

(65) Prior Publication Data

US 2005/0166043 A1  Jul. 28, 2005

(30) Foreign Application Priority Data

Jan. 23, 2004  (EP)  ................... 04001455

(51) Int. Cl.
*H04L 29/00* (2006.01)
(52) U.S. Cl. ..................................... 713/155
(58) Field of Classification Search .................. 713/155
See application file for complete search history.

(56) References Cited

U.S. PATENT DOCUMENTS

| 6,519,242 | B1 | 2/2003 | Emery et al. |
| 6,584,310 | B1 * | 6/2003 | Berenzweig ............. 455/432.1 |
| 6,603,968 | B2 * | 8/2003 | Anvekar et al. ............. 455/433 |
| 6,992,995 | B2 * | 1/2006 | Agrawal et al. ............. 370/328 |
| 7,096,014 | B2 * | 8/2006 | Haverinen et al. ........ 455/432.1 |
| 7,171,198 | B2 * | 1/2007 | Paila et al. ................ 455/432.1 |
| 7,266,687 | B2 * | 9/2007 | Sowa et al. .................. 713/163 |
| 2001/0030952 | A1 | 10/2001 | Roy |
| 2003/0028763 | A1 * | 2/2003 | Malinen et al. ............. 713/155 |
| 2003/0039361 | A1 * | 2/2003 | Hawkes et al. .............. 380/278 |

OTHER PUBLICATIONS

Ala-Laurila, Juha et al., *Wireless LAN Access Network Architecture for Mobile Operators*, XP-001107810, IEEE Communications Magazine, Nov. 2001, pp. 82-89.

* cited by examiner

*Primary Examiner*—Andrew L Nalven
(74) *Attorney, Agent, or Firm*—Squire, Sanders & Dempsey L.L.P.

(57) ABSTRACT

A method, system, and network elements for authentication and authorization of a mobile terminal (MT) roaming to or in a foreign network different from its home network is provided, the home network having an authentication and authorization home server (AAAH), and the foreign network having a plurality of domains each of which comprises at least one local server (AAAL1, AAAL2) for authentication, authorization and accounting, each of which local servers being connected to at least one network access server (NAS) for handling access for mobile terminals roaming to or in the foreign network, wherein an authentication and authorization of the mobile terminal is performed whenever the mobile terminal performs a roaming, wherein the authentication and authorization is performed according to a procedure pursuant to one of a plurality of hierarchy levels, whereby a combination of network elements involved in the roaming determines the hierarchy level to be used.

29 Claims, 3 Drawing Sheets

AUTHENTICATION AND AUTHORIZATION IN HETEROGENEOUS NETWORKS

FIELD OF THE INVENTION

The present invention relates to authentication and authorization of a mobile terminal roaming to or in a foreign network different from its home network, and particularly to hierarchical authentication and authorization of terminals roaming to or in wireless networks such as WLAN, GPRS and 3G networks. More particularly, the present invention relates to a method, a system and respective network elements for realizing such hierarchical authentication and authorization.

BACKGROUND OF THE INVENTION

In recent years, communication technology has widely spread in terms of number of users and amount of use of the telecommunication services by the users. This also led to an increase in the number of different technologies and technological concepts in use.

Currently, there are several kinds of wireless networks providing an Internet access service, such as Wireless Local Area Networks (WLAN), General Packet Radio Service (GPRS) networks, and Third Generation (3G) networks. Hitherto, each of these networks has basically been regarded as a single and individual network. Hence, network functions of a respective one of the networks have not necessarily been compatible with those of other ones of the networks, and interworking between different networks has been difficult. Recently, there is a trend to integrate those heterogeneous networks to provide an integrated Mobile Internet service. The aim of such an integrated service is to provide an interworking of the networks which are involved in a common procedure initiated by a user, user terminal, and/or one of the involved network. Thus, the user and/or user terminal should not even notice that more than one network might be involved and just experience a seamless service, regardless of the underlying realization.

For the following, a roaming scenario is assumed in which a mobile terminal with so-called multi-mode interfaces for connecting to heterogeneous networks roams among different networks. The mobile terminal will attach to and will roam among these networks from time to time. Therefore, the mobile terminal is required to authenticate and authorize itself in these networks in order to identify itself to the network and to provide its entitlement for access to and/or services of the respective network. For this purpose, the mobile terminal may use credentials such as username/password or the like.

With regard to authentication and authorization, reference is made to an IP network. Nevertheless, for the purpose of the present invention, other packet-based protocols or even non-packet-based protocols are applicable. Any reference to a particular protocol thus serves as an example only.

There exist several authentication and authorization protocols and/or functions in IP- (Internet Protocol) based networks and in cellular mobile communication network. For example, IEEE802.1x is popular in WLAN access, whereas GSM (Global System for Mobile Communication) and GPRS networks use an authentication triple to authenticate mobile subscribers, and an Authentication and Key Agreement (AKA) procedure is used to achieve authentication in 3G networks. However, these protocols are each dedicated to a specific network and are not efficient for use throughout an integrated network environment.

Conventionally, a specialized network for performing such functions as described above is built up "on top of" the communication network, and is often referred to as AAA (authorization, authentication and accounting) network. The thus realized functions like system access and database look-ups can take place in specific and separate AAA nodes, but in practice, these nodes are often implemented within the nodes of the underlying communication network, which has the advantage of a joint use of hardware and thus reduced costs. Notwithstanding the hardware location, the AAA nodes offer a functionality which is distinct from other functionalities. Therefore, in the following specification a node is individually addressed as long as it provides a distinct functionality irrespective of its physical location or implementation.

The structure of an AAA network is usually in line with the structure of an underlying communication network like the Internet or a 3G network. More specifically, an AAA network servicing a domain-based communication network such as the Internet is also organized in a domain-based manner.

The above mentioned and several other networks are often structured in a hierarchical manner in terms of access sub-network and core sub-network. And even within such sub-networks a hierarchical structure is usually applied. In GSM, for example, base stations, base station controllers and mobile switching center represent different hierarchy levels. However, current AAA protocols such as RADIUS do not support such hierarchy.

As stated above, various kinds of networks and respective access and/or service provisioning technologies are evolving very fast. As a result, a common AAA framework is needed to help those network access vendors to administer different kinds of local customers or foreign customers.

In an integrated mobile Internet (cf FIG. 1), a mobile terminal MT has a relation to a home AAA server AAAH in its home network, with which it is registered and which handles its AAA (authentication, authorization and accounting) issues. When the mobile terminal tries to get access to a network different from its home network, called a foreign network, a network access server NAS of the foreign network takes care of the mobile terminal's network access. A network access server, in this connection, stands for an access/attach network element, such as an access router in IP networks, a base station system in GPRS networks, and a Node B and a radio network controller (RNC) in UMTS networks. In order to authenticate the mobile terminal when it roams to or in a foreign network and/or a foreign domain, local AAA servers AAAL1, AAAL2 of that network and/or domain need to ask the home AAA server AAAH of the mobile terminal each time the mobile terminal performs a roaming operation, i.e. an initial attach to the foreign network or a handover between different network elements. This is due to the fact that an identification of a mobile terminal roaming to or in a foreign network can conventionally only be accomplished by the home AAA server of this terminal.

The problem is that a conventional procedure for authentication and authorization for a mobile terminal roaming to or in a foreign network comprises information transfers between the mobile terminal, the involved NASs, the involved AAAL(s), and the AAAH at each time the mobile terminal uses another NAS for network access.

Since time latency between different networks, i.e. between a local AAA server AAAL in a foreign network and the home AAA server AAAH in a mobile terminal's home network is rather long, a procedure as the one described above will cause a significant latency in network access whenever a terminal/user performs a roaming operation. This problem is even more distinct when a terminal/user frequently switches between heterogeneous networks. This may particularly be the case in networks with a rather small coverage area or a plurality of domains having a relatively small coverage area, e.g. in WLAN networks. Also in an area where 3G and WLAN networks overlap and complement each other, a mobile terminal frequently performs roaming operations among different access points and/or Nodes B. Thus, the conventional procedure for authentication and authorization of roaming terminals would be a big obstacle to seamless mobile communication service such as mobile Internet services.

SUMMARY OF THE INVENTION

Consequently, it is an object of the present invention to remove the above drawbacks inherent to conventional authentication and authorization procedures and to provide an accordingly improved method and system as well as respective network elements.

According to a first aspect of the invention, this object is for example achieved by a method for authentication and authorization of a mobile terminal roaming to or in a foreign network different from its home network, the home network having an authentication and authorization home server, and the foreign network having a plurality of domains each of which comprises at least one local server for authentication, authorization and accounting, each of the local servers being connected to at least one network access server for handling access for mobile terminals roaming to or in the foreign network, the method comprises the steps of: detecting a roaming of the mobile terminal; identifying a combination of network elements involved in the detected roaming; and selecting one of a plurality of authentication and authorization procedures to be performed based on the identified combination.

According to a second aspect of the invention, this object is for example achieved by a system for authentication and authorization of a mobile terminal roaming to or in a foreign network different from its home network, the system comprising an authentication and authorization home server in the home network, at least one local server for authentication, authorization and accounting in each of a plurality of domains of the foreign network, and at least one network access server for handling access of mobile terminals roaming to or in the foreign network, each of which network access servers being connectable to one of the local servers, the system comprises: a detector for detecting a roaming of the mobile terminal; an identifier for identifying a combination of network elements involved in the roaming being detected by the detector; and a selector for selecting one of a plurality of authentication and authorization procedures to be performed based on the combination being identified by the identifier.

According to a third aspect of the invention, this object is for example achieved by a serving node for authentication, authorization and accounting in a domain of a network, the serving node being a local server of the domain to which a mobile terminal is attachable, which mobile terminal is registered with a home server of its home network, and the serving node being connectable to at least one network access server for handling access of mobile terminals roaming to or in the network, the serving node comprising: an authentication and authorization processor for authentication and authorization of the mobile terminal, which processor is operable according to a procedure being selectable based on an identified combination of network elements which are involved in a detectable roaming of the mobile terminal.

According to a fourth aspect of the invention, this object is for example achieved by a home serving node for authentication, authorization and accounting in a domain of a network, the home serving node being a home server of a mobile terminal being attachable to another network, the home serving node comprising: key generating means being configured to generate an encryption key for the mobile terminal using at least authentication information of the mobile terminal, which information is receivable from a serving node of the other network; and a transceiver being configured to receive at least the authentication information from and to transmit the encryption key to the serving node.

According to a fifth aspect of the invention, this object is for example achieved by a network access server being connectable to a local server of a domain of a network, the network access server comprising accessing means being configured to handle access of a mobile terminal to the network; and a transceiver being configured to transmit and receive a local security information of the mobile terminal and other information to and from the connectable local server, another connectable network access server and a connectable mobile terminal; wherein the network access server is adapted to authenticate and authorize according to a procedure being selectable based on an identified combination of network elements which are involved in a detectable roaming of the mobile terminal.

According to a sixth aspect of the invention, the object is for example achieved by mobile terminal which is able to register with a home server in its home network and which is attachable to a foreign network by means of a network access server of the foreign network, the foreign network having a plurality of domains each of which comprises at least one local server for authentication, authorization and accounting, each of the local servers being connectable to at least one of the network access servers, wherein the mobile terminal is adapted to an authentication and authorization according to a procedure being selectable based on an identified combination of network elements which are involved in a detectable roaming of the mobile terminal.

It is an advantage of the present invention that an optimized network access performance is provided for a mobile terminal roaming among heterogeneous networks.

It is a further advantage of the present invention that it provides an AAA framework. Therewith, significantly improved AAA performance is provided.

It is a further advantage of the present invention that roaming latency in AAA procedures is reduced and that seamless/undelayed roamings are provided in integration of current networks.

It is still another advantage of the present invention that authentication and authorization procedures can be performed in a hierarchical manner. Thereby, it is advantageous that less network elements and less interfaces between these are involved, whereby less network load is created. Further, it is advantageous that such a hierarchy can be arranged in accordance with different roaming types.

Further, it is an advantage of the present invention that they can be implemented in existing AAA architecture.

Still further, it is an advantage of the embodiments of the present invention that an authentication and authorization according to the present invention can be handled in local scope. Therewith, it is advantageous that it is unnecessary to ask the home AAA server each time a mobile terminal gets access to another network access server in a foreign network.

BRIEF DESCRIPTION OF THE DRAWINGS

In the following, the present invention will be described in greater detail with reference to the accompanying drawings, in which.

DETAILED DESCRIPTION OF EMBODIMENTS OF THE PRESENT INVENTION

It is to be noted that the present invention will be described with a specific focus on the usage of AAA network elements. Nevertheless, the present invention is not limited to such specialized AAA network elements or an existing AAA network infrastructure but is also applicable to any other network elements as long as these provide e similar functionality as the ones described herein.

Figure 1:
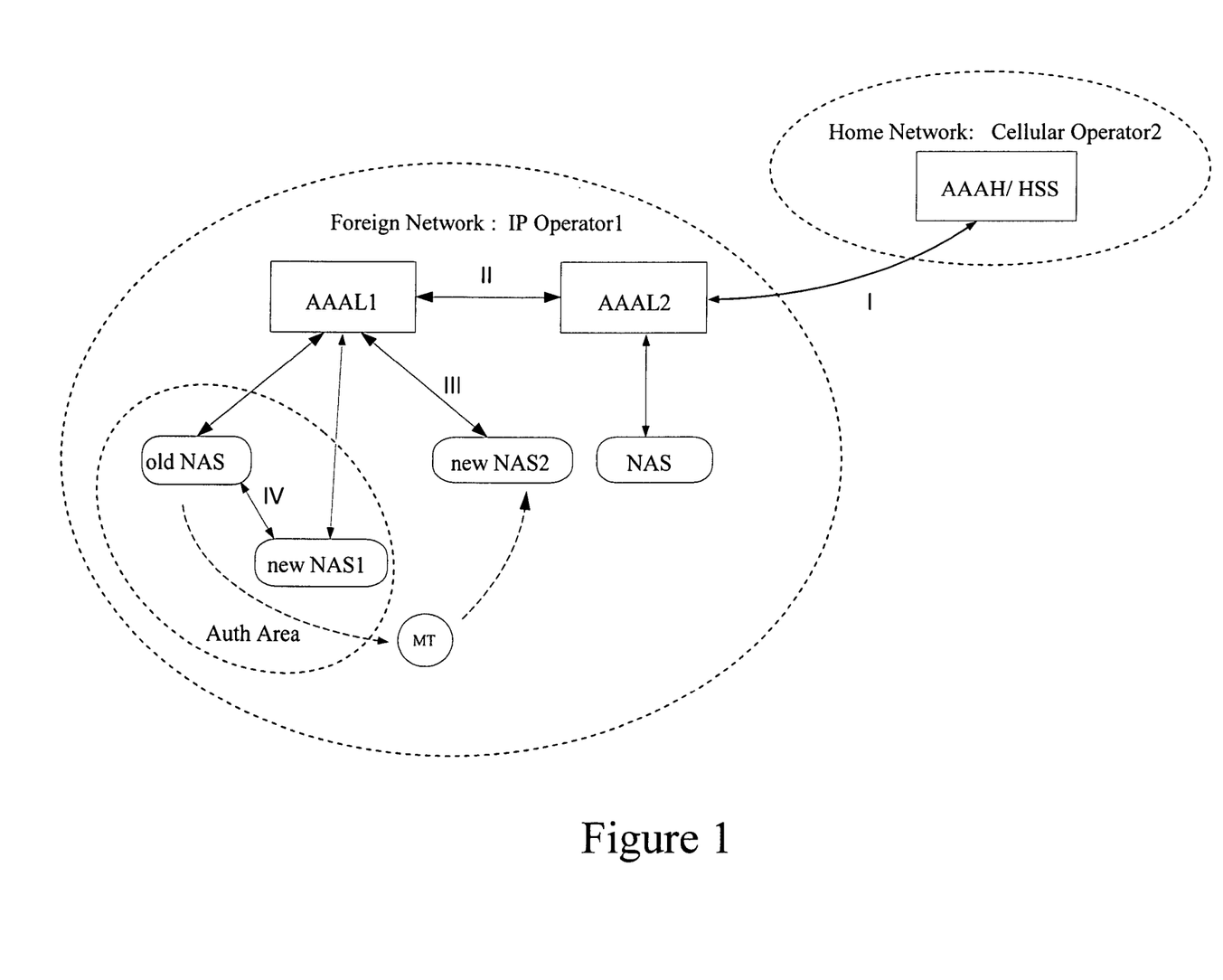
FIG. 1 presents a hierarchical framework of authentication and authorization according to an embodiment of the invention.

FIG. 1 presents a hierarchical framework for authentication and authorization according to an embodiment of the present invention.

In FIG. 1, two individual and heterogeneous networks are exemplarily illustrated. One of these networks is denoted as 'Home Network' being operated by 'Cellular Operator2', wherefore it can be regarded as a cellular mobile communications network such as a GSM, GPRS, or 3G network. The other network is denoted by 'Foreign Network' being operated by 'IP operator1', wherefore it can be regarded as an IP-based network or any other packet-based network such as the Internet. It is to be noted that both of the illustrated networks represent domain-based networks, i.e. networks being organized and administered in domains or realms. Hence, the present invention can also be applied in any other domain-based network than the ones illustrated in FIG. 1 and/or mentioned above.

The network element being depicted within the 'Home Network' shows an authentication and authorization home server AAAH of that network. Any mobile terminal MT such as the illustrated one (whose mobility is indicated by broken arrows reaching/leaving the mobile terminal), which is registered in that network, i.e. for which 'Home Network' is its home network, is serviced by this home AAA server AAAH in terms of authentication, authorization and accounting issues. In a cellular network, this home AAA server may for example also be a home subscriber server HSS or a home location register HLR.

The other network is denoted by 'Foreign Network' because it is a network different from the home network of the mobile terminal in question, to or in which this mobile terminal is roaming. In this foreign network with a plurality of domains, two local AAA servers AAAL1, AAAL2 for authentication, authorization and accounting are illustrated, each of which is arranged in one of the plurality of domains. Each of the local AAA servers is connected to at least one network access server NAS, oldNAS, newNAS1, newNAS2. In this connection, a network access server stands for an access network element and is configured to handle access of mobile terminals roaming to or in this network. Such network access servers may be access routers in IP networks, base station systems in GPRS or GSM network, Nodes B and radio network controllers (RNC) in UMTS networks, for example.

According to the present invention, authentication and authorization (together abbreviated by auth) of a mobile terminal roaming to or in a foreign network is divided into different hierarchies according to different roaming types. Therefore, a roaming of said mobile terminal is detected, i.e. an initial attach to a network or a handover between network elements such as the home AAA server, the local AAA servers and the network access servers, a combination of network elements involved in the roaming is identified, and one of a plurality of authentication and authorization (auth) procedures to be performed is selected based on the identified combination. An authentication and authorization is then performed based on the selected procedure. However, it is of no particular relevance for the present invention how such an detecting is realized, or whether the roaming is mobile-originated or network-originated. For detecting a handover, for example, a conventional method known from GSM or GPRS may be used. An identifying may for example be based on internal messages of the networks and/or an analysis of these, an selecting may for example be performed by one of the involved network elements on the basis of obtained knowledge.

By means of the new auth method called HAA (Hierarchical Authentication and Authorization) it is possible to reduce the roaming latency and to improve performance of AA protocols, particularly in an integration of the Mobile Internet.

The hierarchical auth method HAA is accomplished by generating and allocating a local security information to the roaming mobile terminal and distributing it in the local network domain, when the mobile terminal is authenticated by the respective local AAA server for the first time, i.e. on the occasion of an attach to the foreign network or on the occasion of a handover to another network element. This will be explained in grater detail below.

In the following, four hierarchy levels of the method according to the present invention are described in more detail with reference to FIG. 1. In FIG. 1, each of these hierarchy levels is indicated by one of reference signs I, II, III, or IV. Each of these reference signs denotes the respective interface, over which relevant authentication information is transferred during the procedure according to the respective hierarchy level.

First Hierarchy Level

The first hierarchy level (I) is performed upon an inter-network and inter-domain roaming of the mobile terminal MT from its home AAA server AAAH to a local AAA server AAAL2 of the foreign network. This happens when the mobile terminal enters a foreign network/domain for the first time, i.e. when the mobile terminal attaches to the foreign network. Note that attaching in this connection means a first access of a mobile terminal to a network different from its home network.

In this hierarchy, current authentication and authorization protocols may be re-used, but there are several modifications needed. A correspondingly modified auth procedure could be as follows:

Upon attaching of the mobile terminal MT to the foreign network, the following steps are additionally performed: allocating a local identity such as local username/password, local identity and key, or local certificate to the mobile terminal MT by the local server AAAL2, in the domain of which the mobile terminal attaches to said foreign network; defining and generating a local security information representing a binding of a user identity of the mobile terminal MT and the allocated temporary local identity by said local server AAAL2; allocating the local security information to the mobile terminal MT by the local server AAAL2. In this connection, allocation also includes an informing of the mobile terminal about the allocated local security information and/or local identity. The mobile terminal uses the local security information for authentication. Once the local username/identity/certificate is authenticated/authorized, the corresponding real identity is authenticated/authorized.

It is also possible that a lifetime for the local security information is defined. Such a lifetime can optionally be determined according to the home server's authorization-lifetime and/or a local policy.

The type of the local security information is preferably be according to currently used auth methods. For example, if the mobile terminal uses an authentication based on username/password, the local security information is also a local username/password, and if the mobile terminal uses an authentication based on ID/Key, the local security information is also a local ID/key, and so on.

Further, the network access server NAS, which handles access of the mobile terminal MT to the foreign network, asks the mobile terminal MT for its authentication information or credentials. These may be, for example, username/password, a MD5 Message-Digest Algorithm challenge, or EAP-(Extensible Authentication Protocol) based data. Then, the mobile terminal MT replies by transmitting its authentication information or credentials to the asking network access server NAS, and the network access server NAS forwards the received authentication information to the local AAA server AAAL2 being connected thereto. Since the local AAA server AAAL2 cannot judge about the identity of the mobile terminal because the mobile terminal MT does not belong to, i.e. is not registered with, the local domain of AAAL2, the local AAA server AAAL2 asks the home AAA server AAAH in the mobile terminal's home network to identify the mobile terminal MT. Upon receiving of the identification of the mobile terminal from the home server AAAH, i.e. after the home sever AAAH and the local server AAAL2 authenticate the mobile terminal, the local server AAAL2 distributes the allocated local security information to the mobile terminal. Further, upon receiving said local security information from the local AAA server, the mobile terminal authenticates and authorizes its identity within the local domain of the foreign network. In other words, the performing of an authentication and authorization of the mobile terminal uses the local security information.

A distributing of the local security information according to the invention can either be non-confidentially or confidentially. Although an unconfidential (i.e. untrustworthy) distribution is possible in line with the invention, the use of a confidential distribution is preferable in order to protect the distribution from being attacked, i.e. to avoid an eavesdropping or manipulating of the local security information.

The way of confidentially distributing the local security information to the mobile terminal provides for information integrity during a procedure of the present invention. The local server AAAL2 will distribute the local security information to the mobile terminal MT through the network access server NAS. Since the NAS has a pre-configured security association with the local server AAAL2, it is straightforward for the local server to send the local security information to the network access server NAS confidentially. But from the network access server to the mobile terminal, a confidential distribution is not such straightforward. In detail, there are two kinds of methods to distribute the local security information in a confidential manner.

The first kind may be used in authentication methods which support a mutual authentication, such as PEAP (Protected Extensible Authentication Protocol) and EAP-TLS (Transport Layer Security of the Extensible Authentication Protocol). These methods often build a secure channel between the authenticator (in this case, the network access server NAS) and the supplicant (in this case, the mobile terminal MT). Thus the local security information can be transported confidentially between these.

The other kind of distributing the local security information to the mobile terminal is to be used in authentication methods that do not build a secure channel between the network access server NAS and the mobile terminal MT. Then, a request for issuing a confidential encryption key is be transmitted from the local server AAAL2 the home server AAAH. Such an encryption key is for example generated by the home server using at least the authentication information of the mobile terminal, which has been transmitted along with the request for the key. For example, hash functions may be used therefor. The home server AAAH passes the confidential encryption key to the local server AAAL2, and the local server can use it to encrypt the local security information allocated to the mobile terminal. After that, the local server transmits the encrypted local security information to the mobile terminal, i.e. it distributes a secret message, namely the local security binding, to the mobile terminal using the encryption key generated by the home AAA server. Since the mobile terminal is also able to generate the confidential encryption key using at least its own authentication information, it can decrypt and verify the local security information.

For example, the home AAA server AAAH may generate as the encryption key a 128 bits key, K1=PRF (credential, password, type), wherein PRF stands for a pseudo-random function such as a kind of hash function, e.g. MD5. "Credential" is the mobile terminal's auth response/information to the network access server's request and it is fresh in order to guarantee freshness of the key. "Password" is the user's password. "Type" is a type of this key, such as encryption, integrity, etc. Thus, the encrypted local security information equals local security information XOR K1. The mobile terminal decrypts it as follows, local security information:=encrypted local security information XOR K1 equals local security information XOR K1 XOR K1. Note that XOR stands for a logical exclusive-or operation.

This method can be introduced to current protocols such as Diameter.

Consequently, there are four network elements involved in the procedure of the first hierarchy level, i.e. MT, NAS, AAAL2, and AAAH. Thus, this procedure is not too quick, particularly because of the high latency of communications between the different networks.

Therefore, it is preferable that it will be unnecessary to ask the home AAA server each time the mobile terminal performs a roaming within a foreign network. This aim is exemplarily achieved by the following three hierarchy levels. These are based on the information whose generation and distribution was already described in connection with the first hierarchy level. Thus, a description of the generation and distribution of such information will be omitted in the following.

Second Hierarchy Level

The second hierarchy level (II) is performed upon an intra-network and inter-domain roaming/handover of the mobile terminal MT from a first network access server NAS being connected to a first local AAA server AAAL2 of a first domain of the foreign network to a second network access server oldNAS, newNAS1, or newNAS2 being connected to a second local AAA server AAAL1 of a second domain of the foreign network. In this hierarchy level, the new (second)

local AAA server AAAL1 gets the local security information of the mobile terminal MT from the old (first) local AAA server AAAL2 by sending a request for the mobile terminal's local security information to the AAAL2. After receiving the requested local security information, the new local server AAAL1 uses it for authentication and authorization of the mobile terminal within the local domain.

Here as well, four network elements are involved in the auth procedure, i.e. MT, network access server, AAAL1, and AAAL2, wherein the new network access server may be oldNAS, newNAS1 or newNAS2. This auth procedure eliminates any signaling between local servers and the home server in the home network and, thus, it is faster than the procedure pursuant to the first hierarchy level.

Third Hierarchy Level

The third hierarchy level (III) is performed upon an intra-domain roaming/handover of the mobile terminal MT from a first network access server oldNAS of a domain of said foreign network to a second network access server newNAS2 of the same domain.

In this hierarchy level, the new (second) network access server newNAS2 gets the local security information of the mobile terminal MT from the local AAA server AAAL1, to which both the new and the old network access servers (oldNAS, newNAS2) are connected, by sending a request for the mobile terminal's local security information to the AAAL1. After receiving the requested local security information via a predetermined security association between these, the new network access server newNAS2 uses it for authentication and authorization of the mobile terminal within the local domain.

There are only three network elements involved in this procedure, i.e. MT, newNAS2, and AAAL1. This auth procedure further eliminates any signaling between local AAA servers and, thus, it is faster than the procedures pursuant to the first and second hierarchy levels.

Fourth Hierarchy Level

The fourth hierarchy level (IV) is also performed upon an intra-domain roaming/handover of the mobile terminal MT from a first network access server oldNAS of a domain of said foreign network to a second network access server newNAS1 of the same domain, but in this case the involved network access servers oldNAS and newNAS1 belong to the same authentication and authorization area AuthArea.

An authentication and authorization area means an area within a domain of a network, within which area network access servers have a predetermined security association with each other, by means of which they share information in a confidential manner. In other words, an authentication and authorization area is an area in which network access servers could trust each other. Such an auth area is illustrated in FIG. 1 by a broken line in the "left bottom" sector of the foreign network. Although only one such area is illustrated in FIG. 1, a large network can consist of several such authentication and authorization areas. For communication of network access servers in the same authentication and authorization area a transfer protocol can be adopted or a specific protocol for AAA information sharing could be designed.

In this hierarchy level, the new (second) network access server newNAS1 gets the local security information of the mobile terminal MT directly from the old (first) network access server oldNAS by sending a request for the mobile terminal's local security information to the oldNAS. After receiving the requested local security information, the new network access server newNAS1 uses it for authentication and authorization of the mobile terminal within the local domain.

Here as well, there are only three network elements involved in this procedure, i.e. MT, oldNAS, and newNAS1. However, since no local AAA server is involved, this auth procedure is still faster than the procedures pursuant to the first, second, and third hierarchy levels.

In this connection, it is to be noted that the procedure of the fourth hierarchy is performed by network access servers that support the concept of auth areas, and which can in this context be regarded as being "smart".

Figure 2:
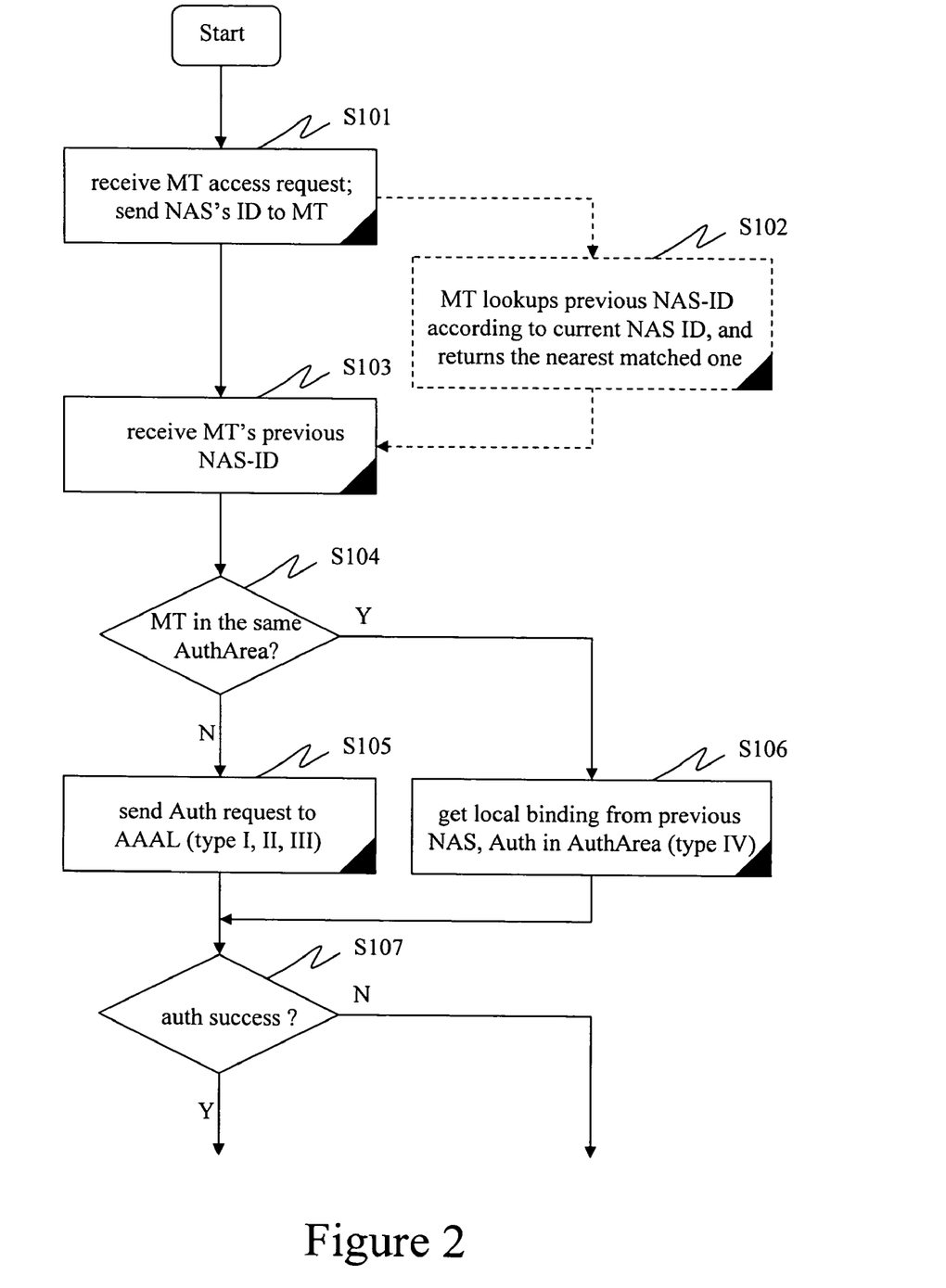
FIG. 2 presents a flow chart of a procedure of a method according to an embodiment of the invention.

FIG. 2 presents a flow chart of a procedure of a method involving a network access server and a mobile terminal according to an embodiment of the present invention, which procedure is performed upon a roaming (i.e. attach or handover) of the mobile terminal. The illustrated procedure serves for deciding whether authentication and authorization is to be performed based on one of the hierarchy levels I, II, III or on hierarchy level IV, i.e. whether the roaming of the mobile terminal was performed within an auth area or not.

Note that a mobile terminal should keep a list of its valid local security information and previous network access servers in each network, respectively. It is to be understood that a mobile terminal also stores a list of local security information for each network it has been attached to. When the mobile terminal then again accesses a network it has already accessed beforehand, it can reuse the respective local security information as long as this local security information has not been expired in the meantime, i.e. an option lifetime of the respective local security information has not been elapsed.

After receiving an access request from the mobile terminal MT, the network access server in question sends its identity (such as NAI) to the mobile terminal (S101). In step S102, the mobile terminal looks up a previous NAS-ID, which represents the network access server which handled access for the mobile terminal to the same or another network earlier, according to the currently received NAS identity (NAS-ID). The mobile terminal MT then returns the appropriately chosen NAS-ID, which matches the currently received one at the nearest, to the NAS. The NAS receives the previous NAS-ID returned by the mobile terminal in step S103 and decides in step S104, whether the mobile terminal still resides in the same authentication and authorization area AuthArea as before, i.e. whether there is a previous NAS in the same auth area or not. In case there is a previous NAS within AuthArea, the network access server initiates to get the local security information/local binding from the previous network access server (S 106), which results in an auth procedure of the fourth hierarchy level. Otherwise, the network access server sends a request for authentication and authorization of the mobile terminal MT to the connected local server AAAL (S105), which results in an auth procedure of the first, second, or third hierarchy level. After that, an auth procedure according to the decision of step S104 is performed, and in step S107, the success of this procedure is verified.

A decision according to step S104 can for example be based on a network access server identifier (NAI) such as the base station identity code (BSIC) of GSM. In such an identifier, certain bit extensions can be used to identify a certain network access server, authentication and authorization area, and/or local AAA server. On the basis of such bits being compared with obtained information, a decision according to the one in step S104 can be taken.

The invention of the present application can be implemented in any AAA architecture such as client side, network access servers, and/or AAA servers.

The method according to the present invention can also be advantageously integrated with other solutions for responsive and secure roamings.

Figure 3:
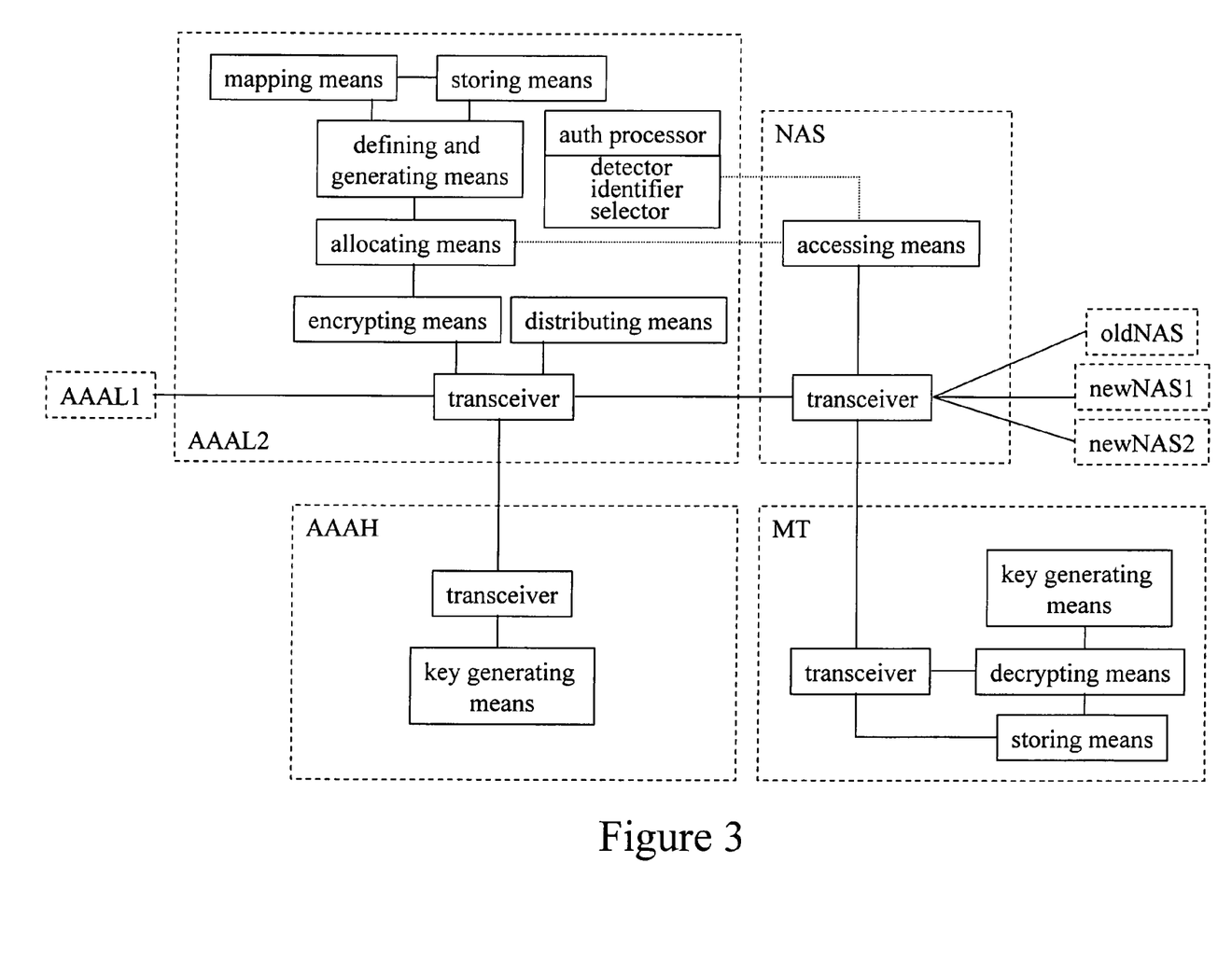
FIG. 3 shows a schematic structure of respective network elements and a mobile terminal according to an embodiment of the invention.

FIG. 3 shows a schematic structure of respective network elements and a mobile terminal according to an embodiment of the invention.

In FIG. 3, the means building up the network elements and the mobile terminal according to the invention are illustrated as blocks. Dashed blocks illustrate the superordinate elements, i.e. network elements AAAL1, AAAL2, AAAH, NAS, oldNAS, newNAS1, newNAS2, and the mobile terminal MT. Solid lines between blocks denote an interface, which can in most cases be understood as a physical layer interface for information exchange. Dotted lines between blocks denote a "virtual" interface, i.e. the thus connected blocks may use information existing and/or generated in the respective other block, but this information is not necessarily transmitted directly between these.

The functions of the respective elements and means is adapted to the operations described above in connection with the method according to the invention. Further, the functions will be described in more detail below.

In FIG. 3, an authentication and authorization processor (hereinafter abbreviated by auth processor) is shown in a common block with detecting, identifying, and selecting means. Such an arrangement, however, is only intended to be an example, and the arrangement of these parts is not limited thereby. Thus, these parts (as well as all of the other shown parts) can also be arranged in a different configuration.

A system for authentication and authorization of a mobile terminal roaming to or in a foreign network comprises, according to the present invention, the above mentioned network elements with their above described functions. All of such network elements are operable according to an authentication and authorization procedure being selectable based on an identified combination of network elements which are involved in a detectable roaming of the mobile terminal, i.e. an attach to the foreign network or a handover between network elements. The system as such preferably comprises a detector for detecting a roaming of the mobile terminal, an identifier for identifying a combination of involved network elements and a selector for selecting one of a plurality of auth procedures to be performed based on the identified combination of network elements. The system preferably further comprises authentication and authorization means for performing the selected auth procedure.

A local AAA server according to the present invention preferasbly comprises allocating means for allocating a temporary local identity to the mobile terminal, when the mobile terminal attaches to the foreign network, and for allocating a local security information as described above to the mobile terminal; defining and generating means for the local security information; storing means for storing the temporary local identity and the local security information; and mapping means for mapping the local security information to a real user account. Further, a local AAA server may comprise a transceiver for transmitting and/or receiving of information to and/or from other local servers, network access servers being connectable thereto and a home AAA server. Additionally, it may comprise encryption means for encrypting the local security information of a mobile terminal before transmitting it thereto and distributing means for distributing the encrypted information to the mobile terminal.

A home AAA server according to the present invention preferably comprises key generating means for generating an encryption key for the mobile terminal and a transceiver for receiving and/or transmitting information concerning the mobile terminal from and/or to a local AAA server.

A network access server according to the present invention preferably comprises accessing means for handling access of a mobile terminal to a network, a transceiver for transmitting and/or receiving any kind of information to and/or from local AAA servers, other network access servers and/or mobile terminals, being connected thereto. A network access server of the present invention is further adapted to support the concept of authentication and authorization areas as it is described above and to support an authentication type decision according to FIG. 2.

A mobile terminal according to the present invention preferably comprises a transceiver for transmitting and/or receiving any kind of information to and/or from a network access server of a network, to which the mobile terminal is attached or attaching. Further, a mobile terminal of the invention may comprise storing means for keeping a list of local security information of each domain and/or network having been attached to. Further, it may comprise key generating means for generating an encryption key using at least its own authentication information and decrypting means for decrypting received encrypted information.

It is to be noted that any of the above mentioned means may be implemented in hardware as well as in software. When implemented in hardware, any suitable technology or technique may be used, such as digital or analog signal processing. Thus, implementations may comprise bipolar, MOS, and/or CMOS transistors as well as known digital signal processors. When implemented in software, any suitable programming language may be used, such as C, C++, Assembler, etc.

A method, system, and network elements for authentication and authorization of a mobile terminal (MT) roaming to or in a foreign network different from its home network is provided, said home network having an authentication and authorization home server (AAAH), and said foreign network having a plurality of domains each of which comprises at least one local server (AAAL1, AAAL2) for authentication, authorization and accounting, each of which local servers being connected to at least one network access server (NAS) for handling access for mobile terminals roaming to or in said foreign network, wherein an authentication and authorization of the mobile terminal is performed whenever the mobile terminal performs a roaming, wherein said authentication and authorization is performed according to a procedure pursuant to one of a plurality of hierarchy levels, whereby a combination of network elements involved in the roaming determines the hierarchy level to be used.

The invention claimed is:

1. A method, comprising:

detecting a roaming of the mobile terminal;

identifying a combination of network elements involved in the detected roaming;

selecting one of a plurality of authentication and authorization procedures to be performed based on the identified combination, wherein a home network has an authentication and authorization home server, wherein a foreign network has a plurality of domains each of which comprises at least one local server configured to authenticate, authorize, and account, and wherein each of the local servers is operationally connected to at least one network access server configured to handle access for mobile terminals roaming to or in the foreign network; and performing an authentication and authorization based on the selected one of a plurality of authentication and authorization procedures, wherein the method, upon attaching of the mobile terminal to the foreign network, further comprises allocating a temporary local identity to the mobile terminal by the local server, in the domain of which the mobile terminal first attaches to the foreign network;

defining and generating a local security information representing a binding of a user identity of the mobile terminal and the allocated temporary local identity by the local server; and allocating the local security information to the mobile terminal by the local server, wherein the performing reuses the allocated local security information to authenticate and authorize in each of said plurality of domains.

2. The method according to claim 1, wherein the local security information is generated in accordance with a used authentication technique.

3. The method according to claim 2, wherein the authentication and authorization is performed based on a procedure of a first hierarchy level upon the mobile terminal performing an inter-domain roaming from its home server to a local server of the foreign network, when the mobile terminal attaches to the foreign network, wherein the procedure comprises:

asking the mobile terminal to provide authentication information by the network access server handling the attachment of the mobile terminal to the foreign network;

transmitting, by the mobile terminal, the mobile terminal's authentication information to the asking network access server;

forwarding, by the network access server, the received authentication information of the mobile terminal to the local server which is operationally connected thereto;

requesting, by the local server, identification of the mobile terminal at the home server;

distributing, by the local server, the local security information to the mobile terminal upon receiving of the identification of the mobile terminal from the home server; and authenticating and authorizing, by the mobile terminal, its identity within the local domain of the foreign network upon receiving of the local security information.

4. The method according to claim 3, wherein the distributing of the local security information from the local server to the mobile terminal is performed in a manner that protects the local security information.

5. The method according to claim 3, wherein the distributing of the local security information comprises:

transmitting the local security information from the local server to the network access server using a predetermined security association between the local server and the network access server; and when a mutual authentication method is used, transmitting of the local security information from the network access server to the mobile terminal using a secure channel which has been established according to a used mutual authentication method.

6. The method according to claim 3, wherein the distributing of the local security information comprises:

when an authentication method without a secure channel between the network access server and the mobile terminal is used, transmitting a request for an encryption key from the local server to the home server along with the authentication information of the mobile terminal;

generating an encryption key by the home server using at least the received authentication information of the mobile terminal and transmitting the encryption key to the local server; and encrypting of the local security information with the encryption key at the local server and transmitting the encrypted local security information from the local server to the mobile terminal, wherein the mobile terminal generates the same encryption key using at least its authentication information, using the same encryption key to decrypt the received encrypted local security information.

7. A method, comprising:

detecting a roaming of the mobile terminal;

identifying a combination of network elements involved in the detected roaming;

selecting one of a plurality of authentication and authorization procedures to be performed based on the identified combination, wherein a home network has an authentication and authorization home server, wherein a foreign network has a plurality of domains each of which comprises at least one local server configured to authenticate, authorize, and account, wherein each of the local servers is operationally connected to at least one network access server configured to handle access for mobile terminals roaming to or in the foreign network; and performing an authentication and authorization based on the selected one of a plurality of authentication and authorization procedures, wherein the method, upon attaching of the mobile terminal to the foreign network, further comprises allocating a local identity to the mobile terminal by the local server, in the domain of which the mobile terminal attaches to the foreign network;

defining and generating a local security information representing a binding of a user identity of the mobile terminal and the allocated temporary local identity by the local server; and allocating the local security information to the mobile terminal by the local server, wherein the performing uses the allocated local security information for authentication and authorization, wherein the local security information is generated in accordance with a used authentication technique, wherein the authentication and authorization is performed based on a procedure of a second hierarchy level upon the mobile terminal performing an inter-domain roaming from a first network access server which is operationally connected to a first local server of a first domain of the foreign network to a second network access server which is connected to a second local server of a second domain of the foreign network, the procedure comprising sending a request for the local security information of the mobile terminal from the second local server to the first local server;

transmitting of the local security information of the mobile terminal from the first local server to the second local server; and using the local security information at the second local server for authentication and authorization of the mobile terminal within the local domain.

8. The method according to claim 7, wherein the using the local security information comprises transmitting the local security information to the second network access server using a predetermined security association between the second local server and the second network access server.

9. A method, comprising:
    detecting a roaming of the mobile terminal;
    identifying a combination of network elements involved in the detected roaming;
    selecting one of a plurality of authentication and authorization procedures to be performed based on the identified combination,
    wherein a home network has an authentication and authorization home server,
    wherein a foreign network has a plurality of domains each of which comprises at least one local server configured to authenticate, authorize, and account,
    wherein each of the local servers is operationally connected to at least one network access server configured to handle access for mobile terminals roaming to or in the foreign network; and
    performing an authentication and authorization based on the selected one of a plurality of authentication and authorization procedures,
    wherein the method, upon attaching of the mobile terminal to the foreign network, further comprises
        allocating a local identity to the mobile terminal by the local server, in the domain of which the mobile terminal attaches to the foreign network;
        defining and generating a local security information representing a binding of a user identity of the mobile terminal and the allocated temporary local identity by the local server; and
        allocating the local security information to the mobile terminal by the local server,
    wherein the performing uses the allocated local security information for authentication and authorization,
    wherein the local security information is generated in accordance with a used authentication technique,
    wherein the authentication and authorization is performed based on a procedure of a third hierarchy level upon the mobile terminal performing an intra-domain roaming from a first network access server of a domain of the foreign network to a second network access server of the same domain, the procedure comprising
        sending a request for the local security information of the mobile terminal from the second network access server to the local server of the domain;
        transmitting of the local security information of the mobile terminal from the local server of the domain to the second network access server using a predetermined security association between the local server of the domain and the second network access server; and
        using the local security information at the second network access server for authentication and authorization of the mobile terminal within the local domain.

10. A method, comprising:
    detecting a roaming of the mobile terminal;
    identifying a combination of network elements involved in the detected roaming;
    selecting one of a plurality of authentication and authorization procedures to be performed based on the identified combination,
    wherein a home network has an authentication and authorization home server,
    wherein a foreign network has a plurality of domains each of which comprises at least one local server configured to authenticate, authorize, and account,
    wherein each of the local servers is operationally connected to at least one network access server configured to handle access for mobile terminals roaming to or in the foreign network; and
    performing an authentication and authorization based on the selected one of a plurality of authentication and authorization procedures,
    wherein the method, upon attaching of the mobile terminal to the foreign network, further comprises
        allocating a local identity to the mobile terminal by the local server, in the domain of which the mobile terminal attaches to the foreign network;
        defining and generating a local security information representing a binding of a user identity of the mobile terminal and the allocated temporary local identity by the local server; and
        allocating the local security information to the mobile terminal by the local servers;
    wherein the performing uses the allocated local security information for authentication and authorization,
    wherein the local security information is generated in accordance with a used authentication technique,
    wherein the authentication and authorization is performed based on a procedure of a fourth hierarchy level upon the mobile terminal performing an intra-domain roaming from a first network access server of an authentication and authorization area of the foreign network to a second network access server of the same authentication and authorization area, wherein the first network access server knows the local security information of the mobile terminal, the procedure comprising
        sending a request for the local security information of the mobile terminal from the second network access server to the first network access server;
        transmitting of the local security information of the mobile terminal from the first network access server to the second network access server; and
        using the local security information at the second network access server for authentication and authorization of the mobile terminal within the local domain.

11. The method according to claim 10, wherein an authentication and authorization area is an area within a domain of a network, within which area network access servers have a predetermined security association with each other, using the predetermined security association to share authentication and authorization information in a confidential manner.

12. A system, comprising:
    an authentication and authorization home server in a home network;
    at least one local server configured to authenticate, authorize, and account in each of a plurality of domains of a foreign network;
    at least one network access server configured to handle access of mobile terminals roaming to or in the foreign network, each of which network access servers are operationally connectable to one of the local servers;
    a detector configured to detect a roaming of a mobile terminal;
    an identifier configured to identify a combination of network elements involved in the roaming being detected by the detector;
    a selector configured to select one of a plurality of authentication and authorization procedures to be performed based on the combination being identified by the identifier; and
    an authentication and authorization processor configured to perform authentication and authorization of the mobile terminal based on the selected one of the plurality of authentication and authorization procedure, wherein the local server, in the domain of which the mobile terminal first attaches to the foreign network, allocates a temporary local identity to the mobile terminal and allocates a local security information to the mobile terminal, and wherein the authentication and authorization processor is further configured to reuse the local security information for authentication and authorization in each of said plurality of domains.

13. A system according to claim 12, wherein the home network and the foreign network are either internet protocol (IP)-based, cellular networks or IP-based cellular networks.

14. An apparatus, comprising:
an authentication and authorization processor configured to authenticate and authorize a mobile terminal, which processor is operable according to a procedure which is selectable based on an identified combination of network elements which are involved in a detectable roaming of the mobile terminal,
wherein the apparatus is a local server of the domain to which the mobile terminal is attachable, which mobile terminal is registered with a home server of its home network,
wherein the apparatus is operationally connectable to at least one network access server configured to handle access of mobile terminals roaming to or in the network;
an allocating device configured to allocate a temporary local identity to the mobile terminal, when the mobile terminal first attaches to the network, and to allocate a local security information to the mobile terminal;
a generator configured to define and generate the local security information representing a binding of a user identity of the mobile terminal and the temporary local identity allocated by the allocating device;
a storing device configured to store the temporary local identity and the local security information of the terminal; and
a mapping device configured to map the local security information to a real user account,
wherein the authentication and authorization processor is further configured to reuse the local security information for authentication and authorization in each of a plurality of domains of a foreign network.

15. The apparatus according to claim 14, further comprising:
a transceiver configured to transmit and receive the local security information and other information to and from a local serving node and a network access server which is operationally connectable to the apparatus.

16. The apparatus according to claim 15, wherein the transceiver is further configured to transmit and receive information of the mobile terminal to and from the home server of the mobile terminal for identification of the mobile terminal.

17. The apparatus according to claim 14, further comprising:
an encrypting device configured to encrypt local security information with an encryption key receivable from the home server; and
a distributing device configured to control a distribution the encrypted local security information to the mobile terminal based on a used authentication method.

18. An apparatus, comprising:
an accessing device configured to handle access of a mobile terminal to a network; and a transceiver configured to transmit and receive a local security information of the mobile terminal and other information to and from an operationally connectable local server, another operationally connectable apparatus and an operationally connectable mobile terminal;
an authentication and authorization processor configured to authenticate and authorize according to a procedure which is selectable based on an identified combination of network elements which are involved in a detectable roaming of the mobile terminal,
wherein the apparatus is operationally connectable to a local server of a domain of the network,
wherein the local server allocates a temporary local identity to the mobile terminal, and allocates the local security information to the mobile terminal, and
wherein the authentication and authorization processor is further configured to reuse the local security information for authentication and authorization in each of a plurality of domains of a foreign network.

19. The apparatus according to claim 18, wherein the authentication and authorization processor is configured to support an authentication and authorization area, which is an area within a domain of a network, within which area network access servers have a predetermined security association with each other, using the predetermined security association to share authentication and authorization information in a confidential manner.

20. The apparatus according to claim 18, wherein the apparatus is operable as an access router of an internet protocol (IP) network.

21. The apparatus according to claim 18, wherein the apparatus is operable as a base station system of a general packet radio service (GPRS) network.

22. The apparatus according to claim 18, wherein the apparatus is operable as a Node B of a universal mobile telecommunications system (UMTS) network.

23. The apparatus according to claim 18, wherein the apparatus is operable as a radio network controller (RNC) of a universal mobile telecommunications system (UMTS) network.

24. An apparatus, comprising:
a registering device configured to register with a home server in its home network, and is attachable to a foreign network using a network access server of the foreign network,
wherein the foreign network comprises a plurality of domains each of which comprises at least one local server configured to authenticate, authorize, and account,
wherein each of the local servers are operationally connectable to at least one of the network access servers;
an authentication and authorization processor configured to perform an authentication and authorization according to a procedure which is selectable based on an identified combination of network elements which are involved in a detectable roaming of the apparatus;
a transceiver configured to transmit and receive information to and from one of the network access servers of the foreign network; and
a storing device configured to keep a list of local security information of each network having been attached to, wherein the local security information is allocable to the apparatus by one of the local servers of the foreign networks,
wherein the local server, in the domain of which the apparatus first attaches to the foreign network, allocates a temporary local identity to the apparatus; and wherein the authentication and authorization processor is further configured to reuse the local security information for authentication and authorization in each of said plurality of domains.

25. The apparatus according to claim 24, further comprising:
a key generating device configured to generate an encryption key using at least its authentication information to communicate with a local server; and
a decrypting device configured to decrypt received encrypted information using the encryption key.

26. A system comprising:
an authentication and authorization home server in a home network;
at least one local server for authentication, authorization and accounting in each of a plurality of domains of a foreign network;
at least one network access server for handling access of mobile terminals roaming to or in the foreign network, each of which network access servers are operationally connectable to one of the local servers;
detecting means for detecting a roaming of a mobile terminal;
identifying means for identifying a combination of network elements involved in the roaming being detected by the detecting means;
selecting means for selecting one of a plurality of authentication and authorization procedures to be performed based on the combination being identified by the identifier; and
authentication and authorization means for authenticating and authorizing of the mobile terminal based on the selected one of the plurality of authentication and authorization procedure,
wherein the local server, in the domain of which the mobile terminal first attaches to the foreign network, allocates a temporary local identity to the mobile terminal and allocates a local security information to the mobile terminal, and
wherein the authentication and authorization means reuses the local security information for authentication and authorization in each of said plurality of domains.

27. An apparatus, comprising:
authentication and authorization means for authenticating and authorizing a mobile terminal, which is operable according to a procedure which is selectable based on an identified combination of network elements which are involved in a detectable roaming of the mobile terminal,
wherein the apparatus is a local server of the domain to which the mobile terminal is attachable, which mobile terminal is registered with a home server of its home network, and
wherein the apparatus is operationally connectable to at least one network access server for handling access of mobile terminals roaming to or in a network;
allocating means for allocating a temporary local identity to the mobile terminal, when the mobile terminal first attaches to the network, and for allocating a local security information to the mobile terminal;
defining and generating means for defining and generating the local security information representing a binding of a user identity of the mobile terminal and the temporary local identity allocated by the allocating device;
storing means for storing the temporary local identity and the local security information of the terminal; and
mapping means for mapping the local security information to a real user account,
wherein the authentication and authorization means reuses the local security information for authentication and authorization in each of a plurality of domains of a foreign network.

28. An apparatus, comprising:
accessing means for handling access of a mobile terminal to a network; and
transmitting and receiving means for transmitting and receiving a local security information of the mobile terminal and other information to and from an operationally connectable local server, another operationally connectable apparatus and an operationally connectable mobile terminal,
wherein the apparatus comprises authentication and authorization means for authenticating and authorizing according to a procedure which is selectable based on an identified combination of network elements which are involved in a detectable roaming of the mobile terminal,
wherein the apparatus is connectable to a local server of a domain of the network,
wherein the local server allocates a temporary local identity to the mobile terminal, and allocates the local security information to the mobile terminal, and
wherein the authentication and authorization means reuses the local security information for authentication and authorization in each of a plurality of domains of a foreign network.

29. A computer program, embodied on a computer readable medium, configured to control a processor to implement a method, the method comprising:
detecting a roaming of the mobile terminal;
identifying a combination of network elements involved in the detected roaming;
selecting one of a plurality of authentication and authorization procedures to be performed based on the identified combination,
wherein a home network has an authentication and authorization home server,
wherein a foreign network has a plurality of domains each of which comprises at least one local server configured to authenticate, authorize, and account, and
wherein each of the local servers is operationally connected to at least one network access server configured to handle access for mobile terminals roaming to or in the foreign network; and
performing an authentication and authorization based on the selected one of a plurality of authentication and authorization procedures,
wherein the method, upon attaching of the mobile terminal to the foreign network, further comprises
allocating a temporary local identity to the mobile terminal in the domain of which the mobile terminal first attaches to the foreign network;
defining and generating a local security information representing a binding of a user identity of the mobile terminal and the allocated temporary local identity; and
allocating the local security information to the mobile terminal,
wherein the performing reuses the allocated local security information to authenticate and authorize in each of said plurality of domains.

* * * * *